(12) United States Patent
Bolanos et al.

(10) Patent No.: US 8,864,025 B2
(45) Date of Patent: Oct. 21, 2014

(54) SYSTEM AND METHOD FOR TRACKING TO ORIGINS OF PRODUCE

(71) Applicant: Virtualone, LLC, Plant City, FL (US)

(72) Inventors: Minor Bolanos, Tampa, FL (US); Gary Wishnatzki, Tampa, FL (US)

(73) Assignee: Virtualone, LLC, Plant City, FL (US)

( * ) Notice: Subject to any disclaimer, the term of this patent is extended or adjusted under 35 U.S.C. 154(b) by 147 days.

(21) Appl. No.: 13/717,999

(22) Filed: Dec. 18, 2012

(65) Prior Publication Data

US 2013/0105578 A1    May 2, 2013

Related U.S. Application Data

(63) Continuation of application No. 13/449,892, filed on Apr. 18, 2012, which is a continuation-in-part of application No. 12/977,230, filed on Dec. 23, 2010, now Pat. No. 8,356,751, which is a continuation-in-part of application No. 12/060,734, filed on Apr. 1, 2008, now Pat. No. 7,878,396.

(51) Int. Cl.
| | |
|---|---|
| *G06F 19/00* | (2011.01) |
| *G06F 17/30* | (2006.01) |
| *G06Q 10/08* | (2012.01) |
| *G06Q 50/02* | (2012.01) |
| *G06Q 50/28* | (2012.01) |

(52) U.S. Cl.
CPC .......... *G06F 17/30002* (2013.01); *G06Q 10/08* (2013.01); *G06Q 50/02* (2013.01); *G06Q 50/28* (2013.01)
USPC .......................................... 235/385; 235/375

(58) Field of Classification Search
USPC .......................... 235/385, 375, 383, 492, 382
See application file for complete search history.

(56) References Cited

U.S. PATENT DOCUMENTS

| | | | |
|---|---|---|---|
| 5,166,500 A | 11/1992 | Yoon et al. | |
| 5,478,990 A | 12/1995 | Montanari et al. | |
| 5,783,810 A | 7/1998 | Kelly, Jr. | |
| 6,945,459 B2 | 9/2005 | Flanagan | |
| 6,969,003 B2 | 11/2005 | Havens et al. | |
| 7,566,495 B2* | 7/2009 | Hartman et al. | 428/343 |
| 7,909,239 B2* | 3/2011 | Grant et al. | 235/375 |
| 7,996,285 B2 | 8/2011 | Farmer et al. | |
| 8,356,751 B2* | 1/2013 | Wishnatzki et al. | 235/385 |
| 2005/0075900 A1 | 4/2005 | Arguimbau | |
| 2005/0086132 A1 | 4/2005 | Kanitz et al. | |

(Continued)

FOREIGN PATENT DOCUMENTS

| | | |
|---|---|---|
| JP | 2002-297625 | 10/2002 |
| KR | 10-1999-0019378 | 3/1999 |
| KR | 10-2004-0110912 | 12/2004 |
| KR | 10-2006-0131500 | 12/2006 |

*Primary Examiner* — Thien M Le
(74) *Attorney, Agent, or Firm* — Larson & Larson, P.A.; Frank Liebenow; Justin P. Miller

(57) ABSTRACT

A system for tracking a plurality of larger produce delivered to a consumer includes capturing data related to the larger produce in a computer system and affixing a statistically sequential value to each of the larger produce. A first statistically sequential value and a last statistically sequential value is used by software running on the computer system to form an association between the series of statistically sequential values and the data pertaining to the larger produce in a database. The database is later used to track the origin of the larger produce.

19 Claims, 17 Drawing Sheets

(56) References Cited

U.S. PATENT DOCUMENTS

| | | |
|---|---|---|
| 2006/0111845 A1* | 5/2006 | Forbis et al. .................... 702/19 |
| 2007/0203818 A1 | 8/2007 | Farmer et al. |
| 2007/0293980 A1 | 12/2007 | Gudjonsson et al. |
| 2007/0298147 A1 | 12/2007 | Haus |
| 2009/0065579 A1* | 3/2009 | Grant et al. .................... 235/385 |
| 2009/0242631 A1* | 10/2009 | Wishnatzki et al. ........... 235/385 |
| 2010/0086113 A1 | 4/2010 | Antonacci et al. |
| 2012/0191535 A1* | 7/2012 | Hudetz et al. .............. 705/14.45 |

* cited by examiner

SYSTEM AND METHOD FOR TRACKING TO ORIGINS OF PRODUCE

CROSS-REFERENCE TO RELATED APPLICATION

This application is a continuation in part of U.S. patent application Ser. No. 13/449,892, filed Apr. 18, 2012; which in turn is a continuation in part of U.S. patent application Ser. No. 12/977,230, filed Dec. 23, 2010; which in turn is a continuation of U.S. patent application Ser. No. 12/060,734, filed Apr. 1, 2008, now U.S. Pat. No. 7,878,396, the disclosure of which are hereby incorporated by reference.

FIELD OF THE INVENTION

This invention relates to the field of tracking produce and more particularly to a system and method for tracking the origin of produce for health, safety and product feedback.

BACKGROUND OF THE INVENTION

The delivery of safe produce is performed by many farms in the United States and elsewhere. There have been incidences in which a small amount of produce was contaminated. For example, in 2007, an *E. coli* outbreak was reported and traced back to spinach. This contamination killed three people and sickened more than 200. Authorities isolated the *E. coli* strain and found that it originated from cattle feces and wild pig feces in river water used to irrigate the effected spinach farm. Since the outbreak, lawmakers in Congress have pushed for regular inspection of processing plants. Additionally, the FDA has announced voluntary guidelines for preventing food poisoning in fresh produce.

When such an outbreak occurs, produce from the entire farm is recalled, but often, only a portion of the produce is tainted. In the above example, all spinach from that farm and other farms was recalled and destroyed. There are many farms in which some fields are managed differently than other fields. For example, one field is irrigated with river water and another is irrigated with well water or water from a different source. Another example is one field having one set of pickers and another field having a different set of pickers. If one of the pickers contracts a contagious disease, there is no need to destroy crops from the fields that he or she didn't contact.

Similarly, once the produce is picked, it becomes indistinguishable from similar produce picked by other pickers on the same field or different fields. There is no way for the consumer or distributor/store to provide feedback to the growers regarding product quality, etc.

What is needed is a system and method for tracking produce back to a time/date of picking and the individual fields and/or pickers.

SUMMARY OF THE INVENTION

In one embodiment, a system for tracking larger produce delivered to a consumer is disclosed including a plurality of larger produce originating from a first produce origin and a sequence of pre-printed labels. Each label has a unique code and the unique code on each label is sequentially related to the unique code on a previous label. A value of a first label of the sequence of pre-printed labels is captured and stored into a computer system. The first label is affixed to a first larger produce from the plurality of larger produce. The next label from the sequence of pre-printed labels is applied to another of the plurality of larger fruit until all of the plurality of larger fruit dons one of the sequence of pre-printed labels. A value of a last or next of the sequence of pre-printed labels is captured into the computer system and the computer system associates the entire set of labels from first label of the sequence of pre-printed labels to the last or next label of the sequence of pre-printed labels with the produce origin in a tracking database.

In another embodiment, a method for tracking larger produce delivered to a consumer is disclosed including (a) providing a plurality of larger produce from a produce origin and (b) capturing data related to the produce origin. A (c) sequence of pre-printed labels are provided, each having a unique code and the unique code on each label in sequence having a mathematically sequential value with relationship to the unique code on a previous label. (d) the unique code from a first pre-printed label of the sequence of pre-printed labels is captured into a computer system. (e) The first preprinted label from the sequence of pre-printed labels is affixed to a first larger produce of the plurality of larger produce. (f) The next preprinted labels from the sequence of pre-printed labels are affixed to each remaining larger produce from the plurality of larger produce until all of the larger produce in the plurality of larger produce don a label from the sequence of pre-printed labels. (g) A unique code from the last pre-printed label used from the sequence of pre-printed labels is captured into the computer system. Finally, (h) all of the unique codes from the unique code from the first pre-printed label of the sequence to the unique code from the last pre-printed label are associated with the data in a tracking database.

In another embodiment, a system for tracking a plurality of larger produce from a produce origin is disclosed including capturing data related to the plurality of larger produce into a computer system and affixing a unique code onto each of the larger produce. Each of the unique codes is sequentially related to a previous unique code. Capturing a value of a first unique code and a value of a last unique code into a computer system. The unique codes from the value of the first unique code through to the value of the last unique code are then related with data. The data includes an identification of the produce origin.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
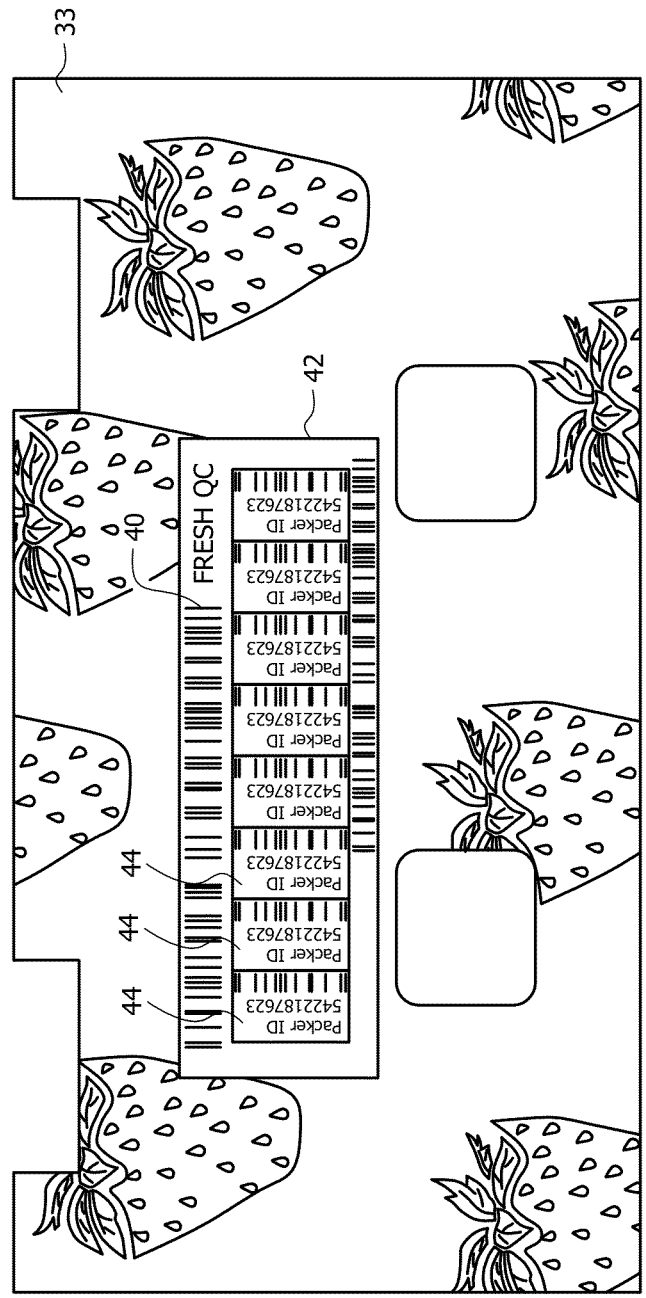
FIG. 1 illustrates a plan view of a label system of the present invention on a field box.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a plan view of a label system of the present invention on a field box is shown. The label 42 is affixed to a surface of the field box 33. The label 42 has a barcode 40 that includes a sequence of digital values (for example, numbers). The label 42 also includes a plurality of sub-labels or child labels 44, in this example eight sub-labels 44. Any number of sub-labels 44 is possible, one for each sub-container held within the over-box or field box 33. Each sub-label 44 has a sub-label identifier that relates to the barcode 40. In some embodiments, the sub-label identifier is a printed series of characters that relate to the sequence of digital values such as "5422187623." In some embodiments, the sub-label identifier includes a barcode that relates to the sequence of digital values. There is at least one sub-label 44 for each sub-container and, in some embodiments, one or more spare sub-labels 44 are provided in case one does not stick or is destroyed.

The field box 33 is a container that holds two or more sub-boxes or sub-containers. For example purposes, the term "clamshell" is used throughout this application to refer to the sub-boxes or sub-containers.

Figure 2:
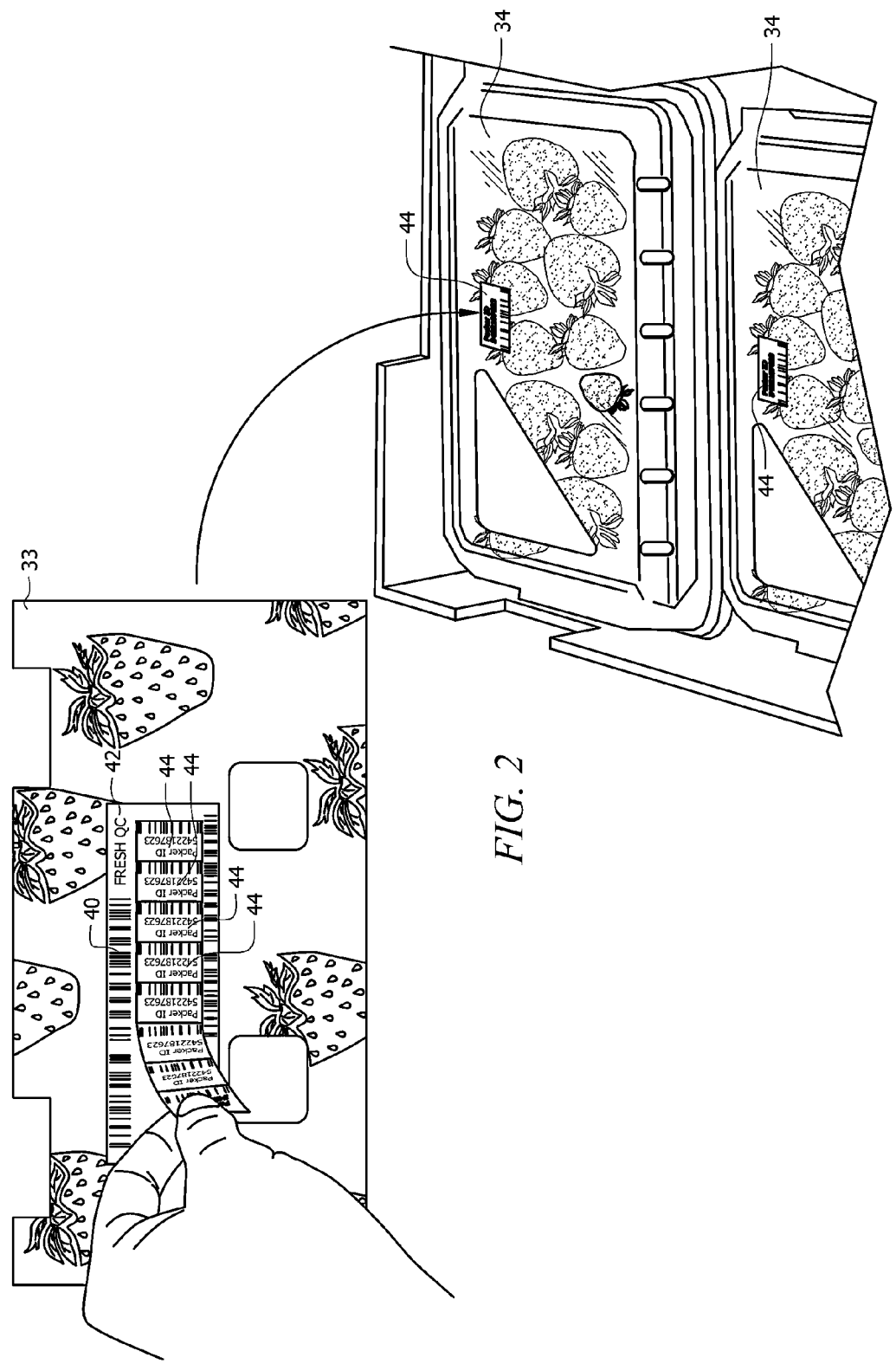
FIG. 2 illustrates a perspective view of a label system of the present invention in use.

Referring to FIG. 2, a perspective view of a label system of the present invention in use is shown. Before or after filling the clamshell boxes 34 with produce, the sub-labels 44 are peeled from the master label 42 and, each sub-label 44 is affixed to each of the clamshell boxes 34 and the clamshell boxes 34 are placed in the field box 33. Note that the barcode 40 on the master label 42 is the same as or related to the sub-label identifier (e.g., barcode 43 or printed digits) on each of the sub-labels 44. In one embodiment, the barcode 40 on the master label 42 has the same numerical value as the sub-label identifier (e.g., barcode 43 or printed digits) on each of the sub-labels 44. In alternate embodiments, some of the numerical values are the same and some differ to distinguish the individual sub-labels. In all embodiments, the barcode 40 is unique, in that, no two sets of labels have the same barcode so as to permit identification of the produce by the barcode.

Figure 3:
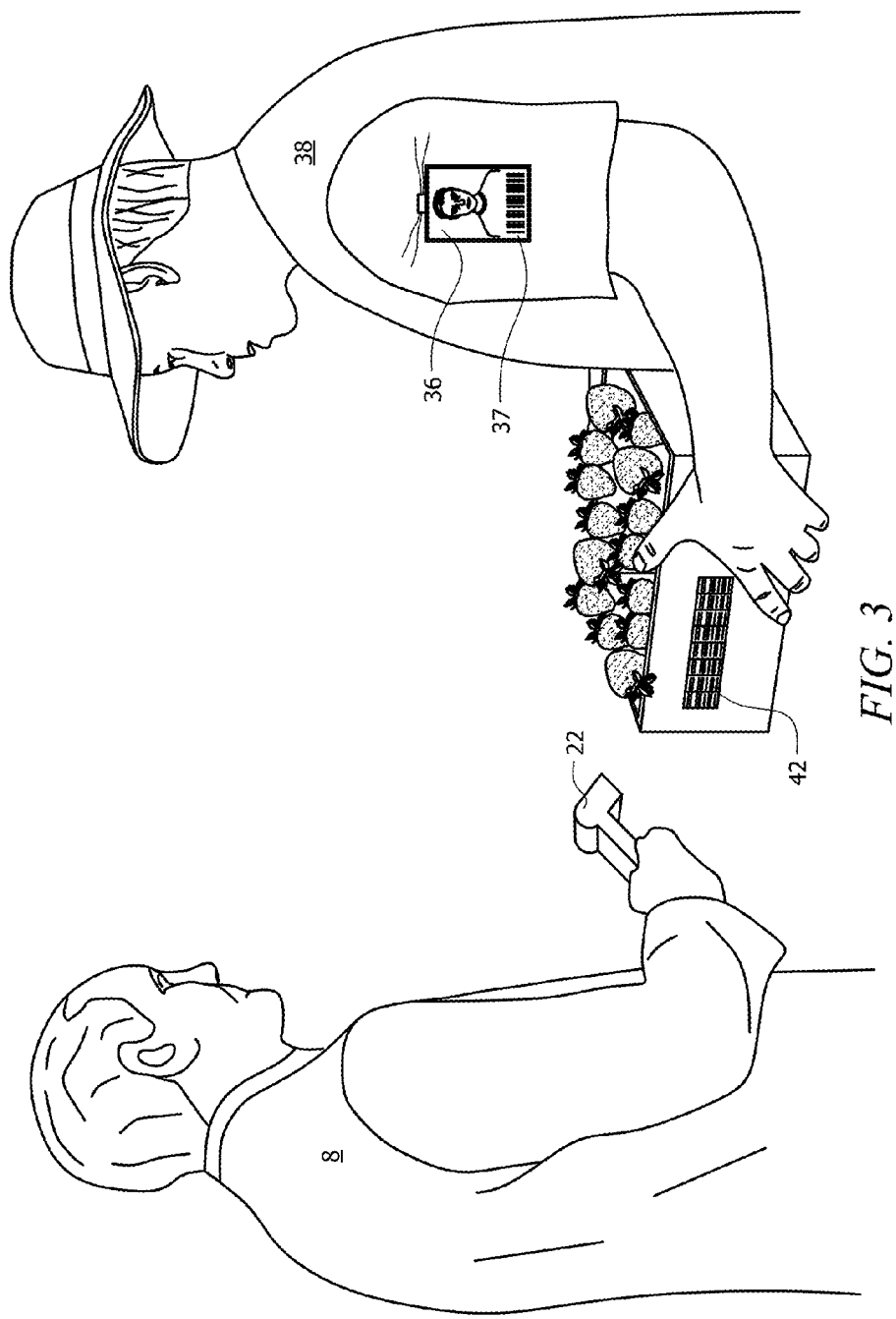
FIG. 3 illustrates a perspective view of a system of the present invention.

Referring to FIG. 3, a perspective view of a system of the present invention is shown. In this example, the picker 38 delivers the field box 33 to a harvest manager or foreman 8 who uses a scanner 22 to scan the barcode 42. In some embodiments, an employee badge barcode 37 on an employee badge 36 of the produce picker 38 is scanned to relate the barcode 40 of the produce to the employee badge barcode 37 (e.g., employ identification number) of the employee.

Any known scanner 22 is anticipated including, but not limited to, hand-held, self-contained portable scanners and tethered scanners, as known in the industry. In embodiments in which the scanner is portable, the data collected is either sent by wireless methods or stored internally to the scanner 22 and sent or transferred at a later time. In embodiments in which the scanner is tethered (connected to a fixed computer base), the data collected is either sent by wired methods, wireless methods or stored internally to the scanner 22 or its associated fixed computer base and sent or transferred at a later time.

Figure 4:
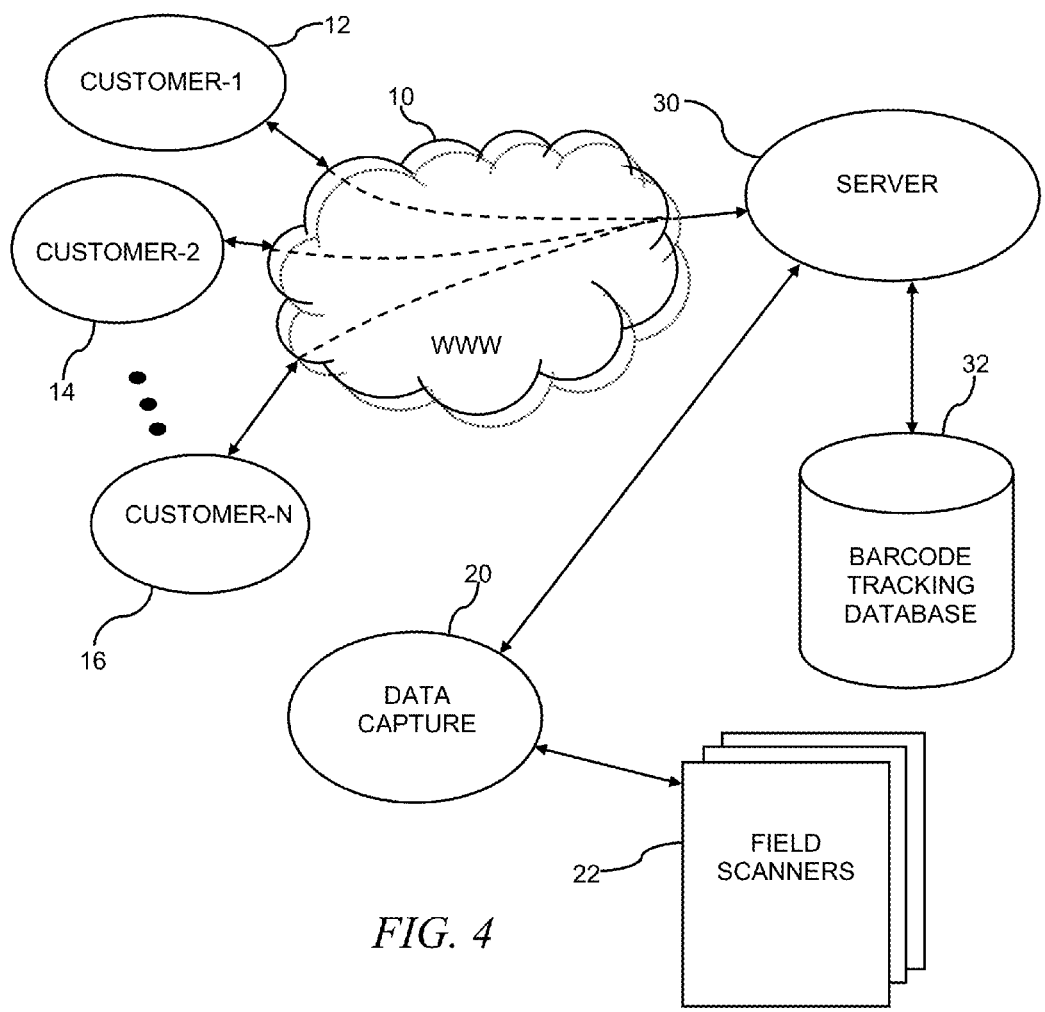
FIG. 4 illustrates a schematic view of a system of the present invention.

Referring to FIG. 4, a schematic view of a system of the present invention is shown. When the field box 33 is distributed to the picker 38, the barcode 40 on the label 42 and the barcode 37 on the picker's badge 36 are scanned by a portable scanner. In some embodiments, these barcodes 40/37 are stored and held at the scanner (field scanner) 22 until the scanner is connected to the server 30 for data capture 20. There are many ways to connect the scanner(s) 22 to the server 30 including, but not limited to, a wireless connection (e.g., 802.11, IRDA, other IR link), a wired connection (e.g., USB, DB9 Serial Port) and a wired connection within a cradle (e.g., USB, Serial) whereas the cradle also provides power for charging the scanner 22. In some embodiments, the server 30 is located remote to the scanners 22 and the data capture 22 is transmitted to the server 30 through a wide area network such as the internet 10.

The uploaded data contains a data record for each field box. The data record contains at least the barcode 40 of the field box 33 and an identification of the origin (e.g., a specific plot, field, row, etc). In some embodiments, the identification of the origin is defined by the barcode 37 of the picker 38 since the picker is assigned to a specific field, plot, etc. In some embodiments, the origin emanates from a stored value in the scanner 22. In some embodiments, the origin is keyed in or scanned into the scanner 22. In addition, in some embodiments, the data record also includes the barcode of the picker 37.

The uploaded data records are entered into a barcode tracking database 32 for future access and analysis. One use of the data records in the barcode tracking database 32 is to determine how many field boxes 33 were picked by a particular picker 38. Another use of the data records in the barcode tracking database 32 is to determine the origin of a given field box 33 for tracing to origin and/or for providing feedback to the grower regarding customer feedback.

In some embodiments, the server 30 is networked to the Internet 10 (WWW) and one or more customers 12/14/16 have access to an application in which the customers 12/14/16 enter the barcode 40 from a purchased clamshell box 34 and provide feedback regarding the quality, freshness, taste, etc. The feedback is added to the barcode tracking database 32 and is then accessible to the owner/manager of the originating farm(s).

Figure 5:
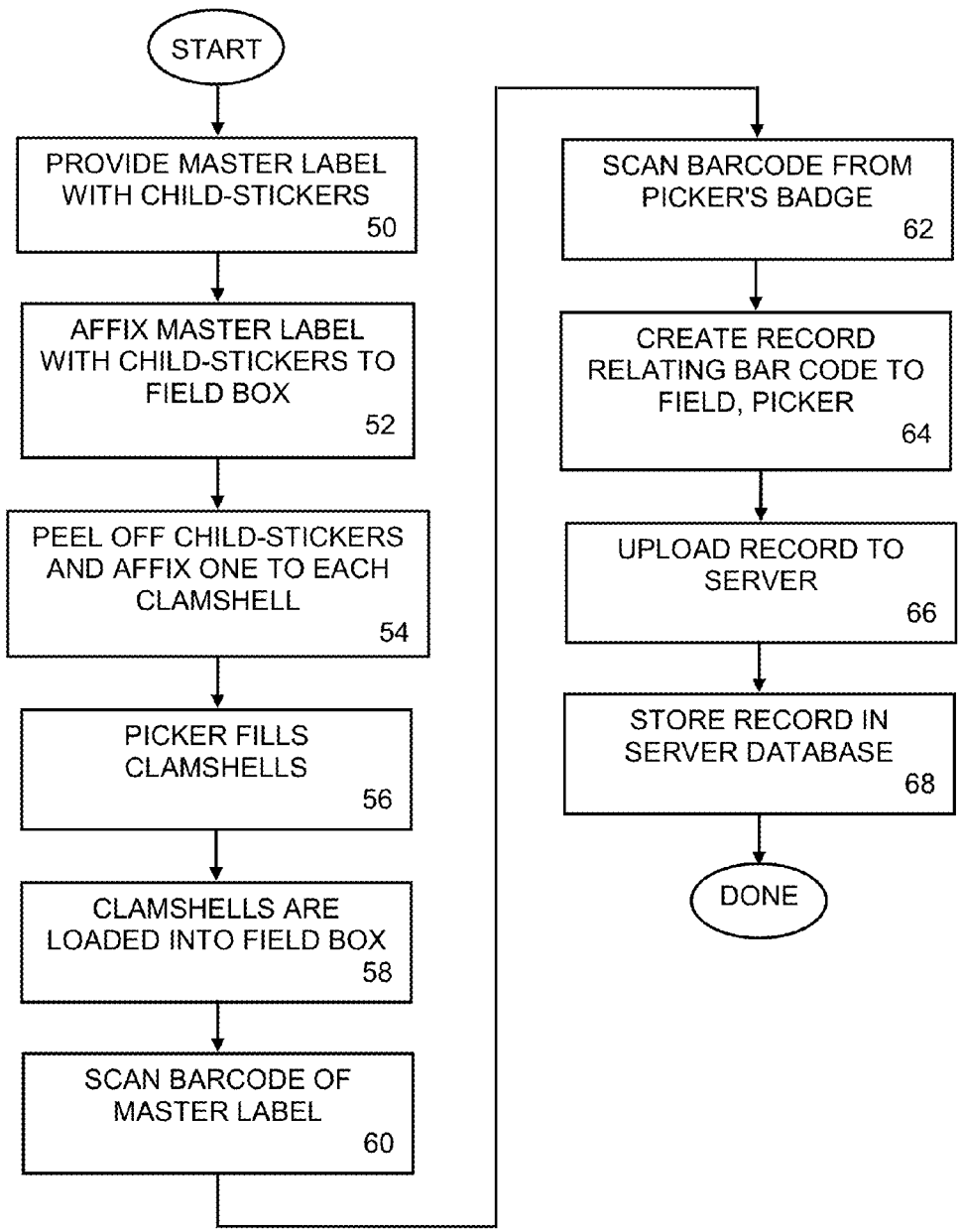
FIG. 5 illustrates a first flow chart of the present invention.

Referring to FIG. 5, a first flow chart of the present invention is shown. The tracking process begins with providing 50 a master label 42. In some embodiments, the master label 42 is provided on a roll. The master label 42 has a plurality of sub-labels 44. The barcode 40 on the master label 42 matches or relates to the sub-label identifier (e.g., barcode 43) on each of the sub-labels 44 and, the barcode is unique, in that, no other master label has the same barcode (at least statistically or during the expected life of the barcode).

The tracking process continues with affixing 52 a master label 42 to each field box 33 as the field box 33 is built or remanufactured/cleaned. In the preferred embodiment, the master label 42 is a peel-and-stick label and peeled from a backing and affixed to the field box 33, although other methods are well known in the industry, all of which are hereby included.

When the field box 33 is ready to be filled, the child stickers or sub-labels 44 are peeled off 54 and each one is affixed to a clamshell or sub-carton 34. Although the term "clamshell" is used throughout this description for simplicity, any carton or container is possible. For example, for strawberries, clear plastic clamshells 34 are often used, but alternately, a one-pint or two-pint wooden or plastic basket is sometimes used. The present invention is intended for any produce that is distributed in a plurality of containers and a subset of the plurality of containers is shipped in an over box (or field box as described above).

Next, the picker fills the clamshells with produce 56. In some embodiments, the picker fills the clamshells 34 with produce and later affixes the label, etc. The clamshells 34 are then loaded 58 into the field box 33.

Once the field box is filled with clamshells 34, the master label barcode 40 is scanned 60. In the preferred embodiment, a barcode 37 from the picker's badge 36 is also scanned to correlate the produce in the clamshells 34/field box 33 with the picker 38. In some embodiments, the scanner 22 is pre-programmed with an identification of the origin of the produce (e.g., field, row, plot, etc.). In some embodiments, the location of the field is entered on the scanner 22 to indicate the origin of the produce (e.g., field, row, plot, etc.). In some embodiments, the barcode from the picker's badge 37 is used to determine the origin of the produce (e.g., field, row, plot, etc.), being that the picker 38 is assigned to a particular field, row, plot, etc.

A data record is created 64 including the barcode 40 of from the label 42 and the origin of the produce. Preferably, the origin of the produce is determined from the badge barcode 37 and, therefore, the data record includes the badge barcode 37. In some embodiments, the data record includes an identifier uniquely identifying the origin of the produce (field, row, plot, etc.).

At some time, one or more data records are uploaded 66 to the server 30 and the server 30 stores 68 the data record(s) in the barcode tracking database 32.

Figure 6:
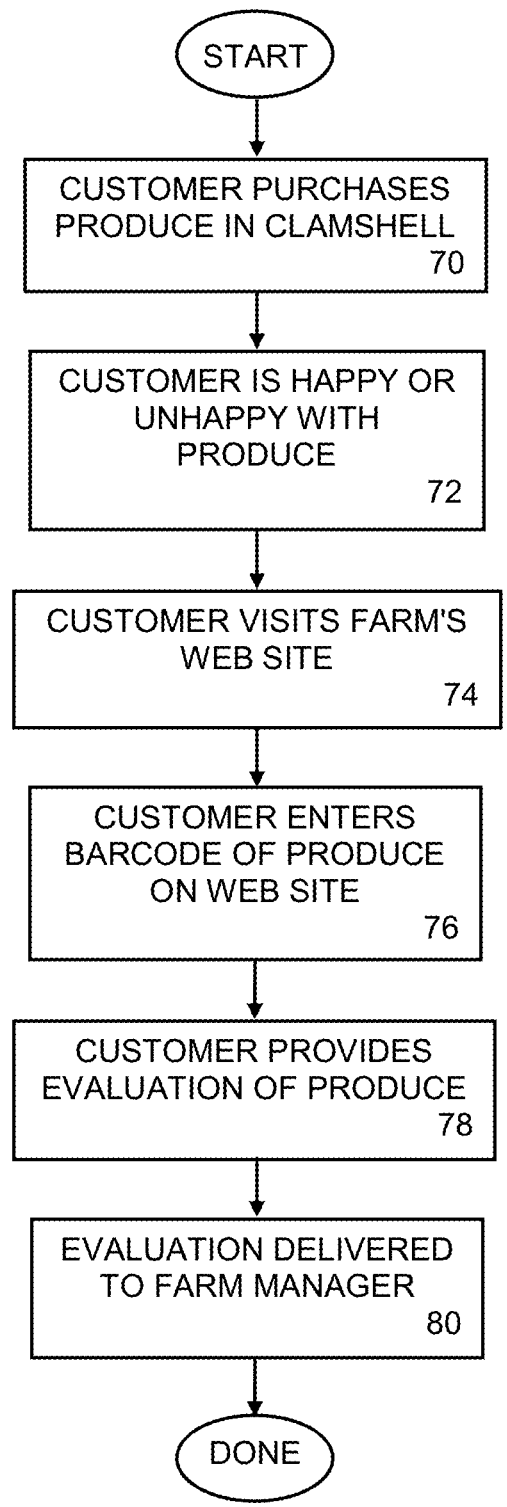
FIG. 6 illustrates a second flow chart of the present invention.

Referring to FIG. 6, a second flow chart of the present invention is shown. After a customer purchases the produce 70 and is either happy or unhappy with the produce 72, they are now able to provide feedback directly to the farm, picker and/or manager down to the package or plot level. In one embodiment, there is a web address (e.g., http://www.wish-farms.com) printed on the sub-label 44. The customer accesses the web address 74 and is presented with a user interface (such as that in FIG. 7). The customer enters the sub-label identifier (e.g., barcode 43 or series of characters) of from the sub-label 44 on the produce 76 into the user interface 76 then provides their evaluation of the produce 78. For example, the customer is unhappy because the produce is spoiled. Once the evaluation is completed by the customer, it is stored and available for delivery to the farm manager 80 or other person so that they can act upon the evaluation.

Figure 7:
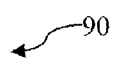
FIG. 7 illustrates a typical user interface of the present invention.

Referring to FIG. 7, a typical user interface of the present invention is shown. In this sample user interface 90, the customer enters contact information, including, in this example, their name, email address and phone number. In this example, the customer also indicates where they purchased the produce. The barcode 43 from the produce is entered in the appropriate fields and the customer has a field to enter a comment or simply check a box if their concern is covered by one of the bullet point 92. The fields shown are examples of one possible user interface. Many alternate user interfaces are known and included in the present application.

Figure 8:
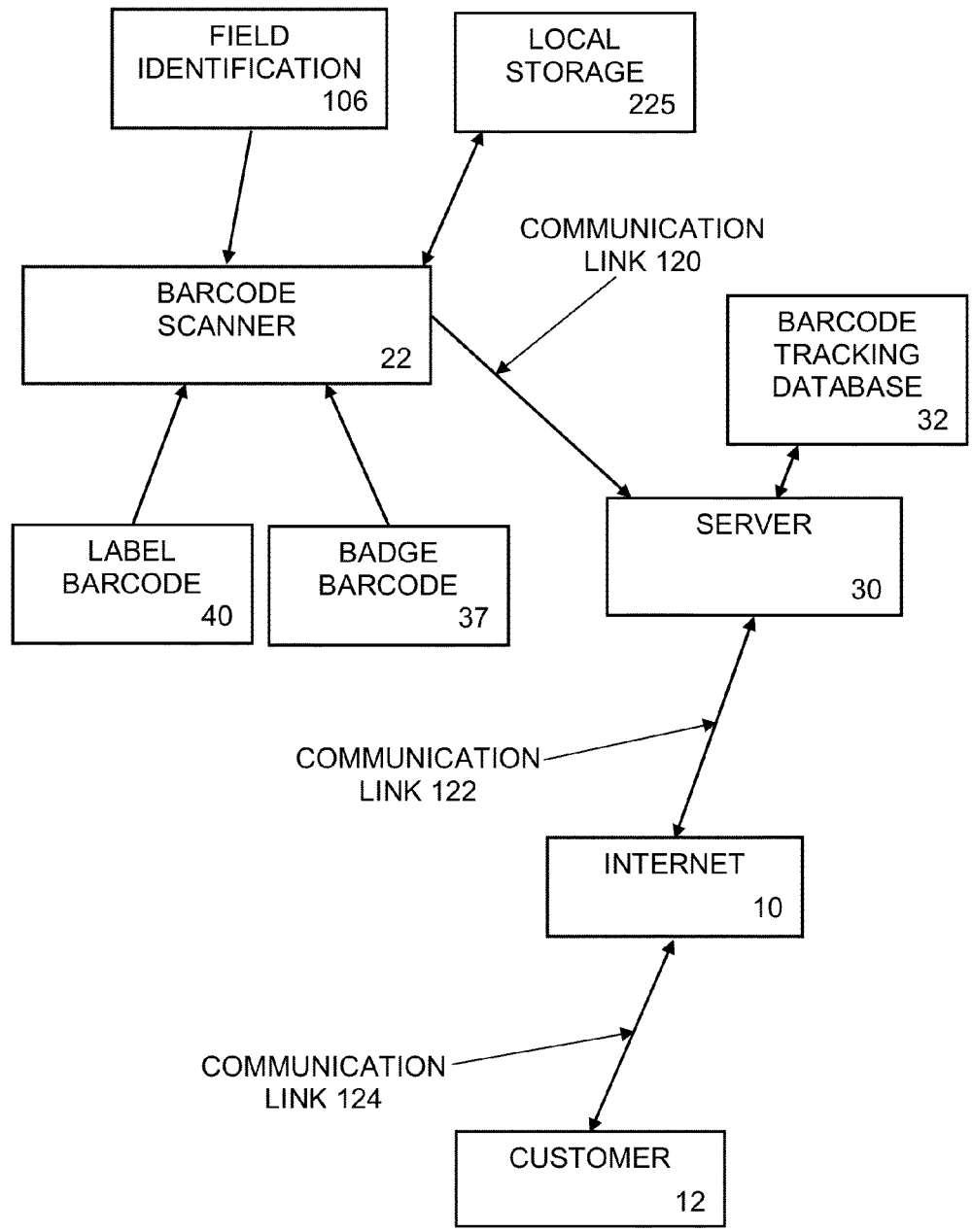
FIG. 8 illustrates a directed chart of the present invention.

Referring to FIG. 8, a directed chart of the present invention is shown. The label barcode 40 is captured by the scanner 22. In some embodiments, the badge barcode 37 is also captured by the scanner 22. In some embodiments, a field identification 106 is either entered on the scanner's 22 user interface or stored within the scanner's 22 memory. In some embodiments, the data collected is stored in local storage 225 for later transmission. Once the data is captured or at some time in the future, a data record for each field box 33 is transferred to the server, preferably over a communications link 120. In alternate embodiments, the data records are transferred by transferring a memory device such as a compact flash card or USB memory stick. The communications link 120 is any transmission link known in the industry, wired or wireless, such as 802.11, USB, Ethernet, Firewire, etc.

After the data records arrive at the server 30, they are stored in the barcode tracking database 32 for access in providing customer feedback, for determining picker performance and/or for tracking the origin of produce back to the field, row, plot, etc. For customer feedback, the server 30 is connected to the Internet 10 by a communications link 122. The communications link 122 is any transmission link known in the industry, wired or wireless, such as 802.11, USB, Ethernet, Firewire, etc. Likewise, the customer(s) is/are connected to the Internet by a communications link 124. This communications link 124 is any transmission link known in the industry, wired or wireless, such as 802.11, USB, Ethernet, Firewire, DOCSIS, Cable, FIOS, DSL, etc.

Figure 9:
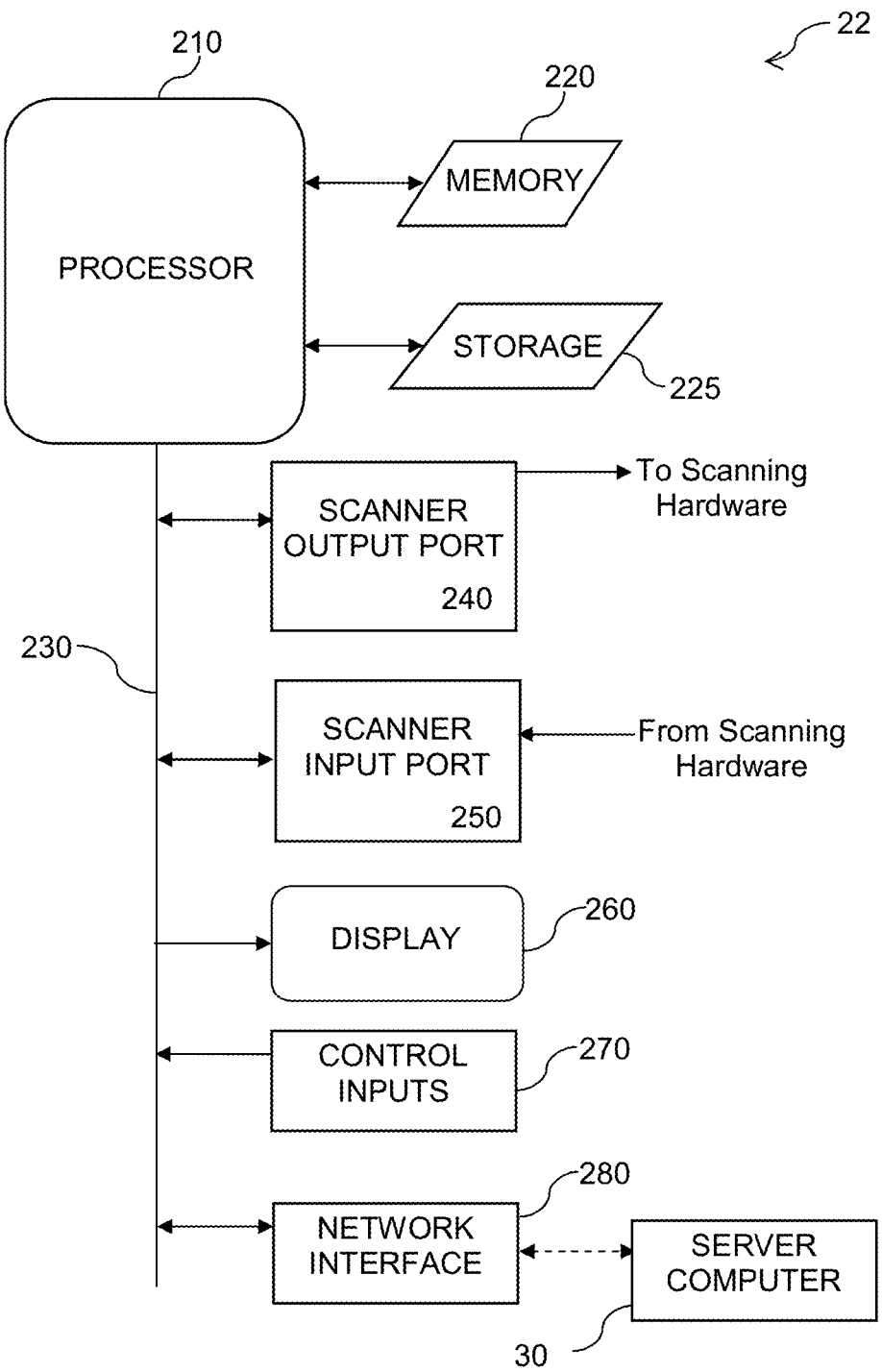
FIG. 9 illustrates a schematic view of a scanner of the present invention.

Referring now to FIG. 9, a schematic view of a barcode scanner of all embodiments of the present invention is shown. The barcode scanner 22 is shown for completeness and the device shown is a simplified example of a typical processor-based scanner that has a processor 210 and associated memory 220 and storage 225. The storage is, for example, Flash memory, battery-backed SRAM or a hard disk. This is an exemplary system and any suitable processor, memory and persistent storage can be substituted including microcontrollers such as the Intel® 80C51, processors such as the Intel® Pentium IV, memory such as SDRAM and DDR and persistent storage such as ROM, EPROM, hard disks, etc. The operating program, data parameters and scanned barcode containing records are typically stored in the persistent storage 225 A system bus 230 interfaces the processor to peripheral devices as discussed below.

The scanner 22 displays information, alerts, prompts, etc., on a display 260. In some embodiments, the display 260 is a graphics display. In some embodiments, the display 260 is a LCD display. In other embodiments, the display is a numeric display, alpha-numeric display, set of lights or any combination thereof. Operation of the system is initiated by control inputs 270. In some embodiments, the control inputs 270 include a keyboard. In other embodiments, the control 270 includes push buttons, switches, potentiometers and digital potentiometers, etc.

The scanner 22 controls the optical scanning hardware through a scanner control output port 240 as known in the industry. There are many known barcode scanning technologies, usually employing a lasing LED to illuminate the barcode while a detector measures reflected light to determine the digits of the barcode. All known barcode technologies including, but not limited to, linear barcodes, two-dimensional barcodes, matrix barcodes, two-dimensional stacked barcodes, postal barcodes, postnet postal barcodes and onecode postal barcodes are included, here within. Likewise, all known encodings of barcodes are also included here within.

Outputs from the scanning hardware are fed to the scanner processor 210 through a scanner input port 250.

The scanner interfaces to the server computer 30 through a network interface 280 connected to the system bus 230. In some embodiments, the part or all of the storage 225 is removable (e.g. SD, memory stick or Compact Flash) and the data records are transferred on the removable storage to the server computer 30.

Figure 10:
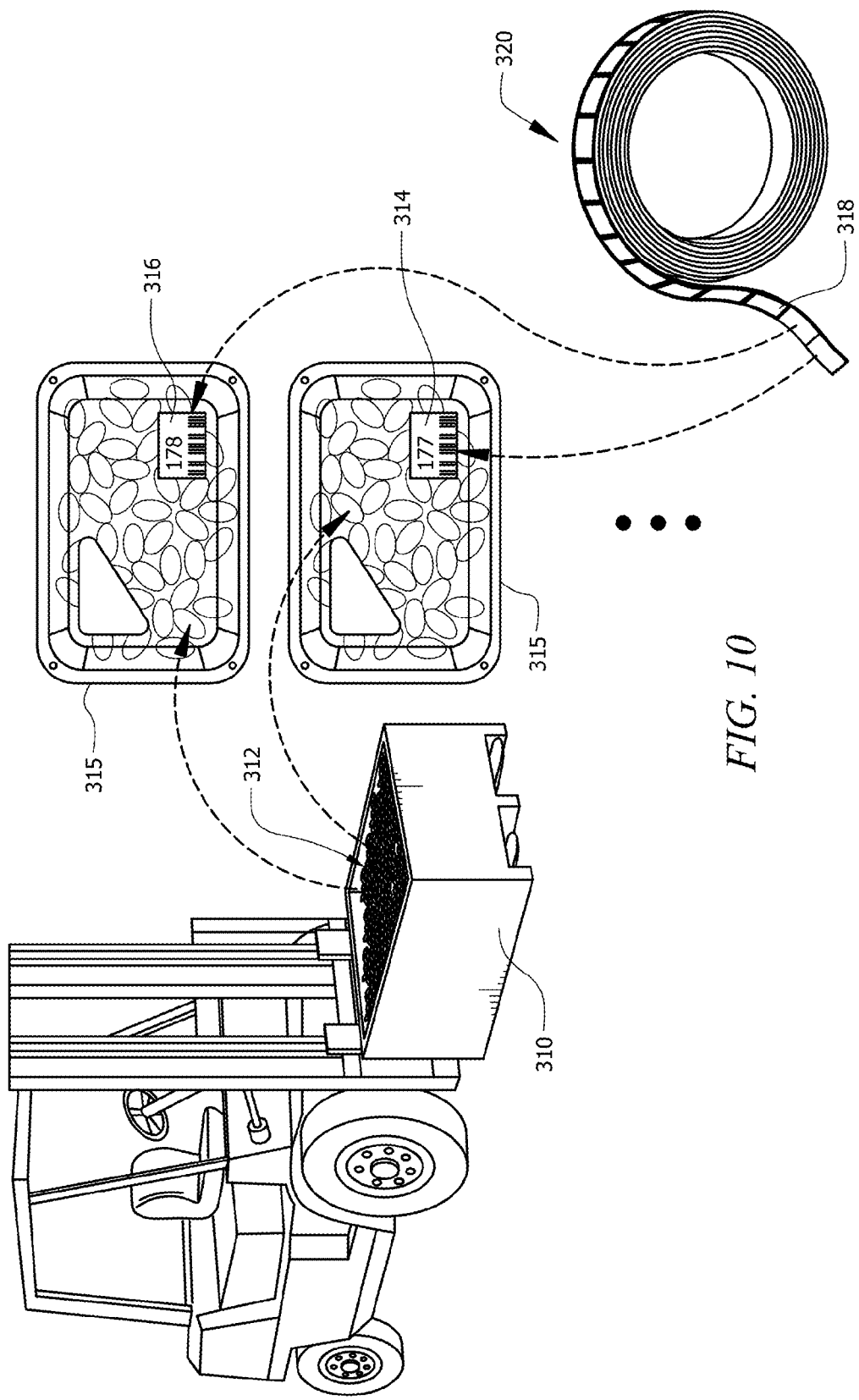
FIG. 10 illustrates a perspective view of a second label system in use.
Figure 10A:
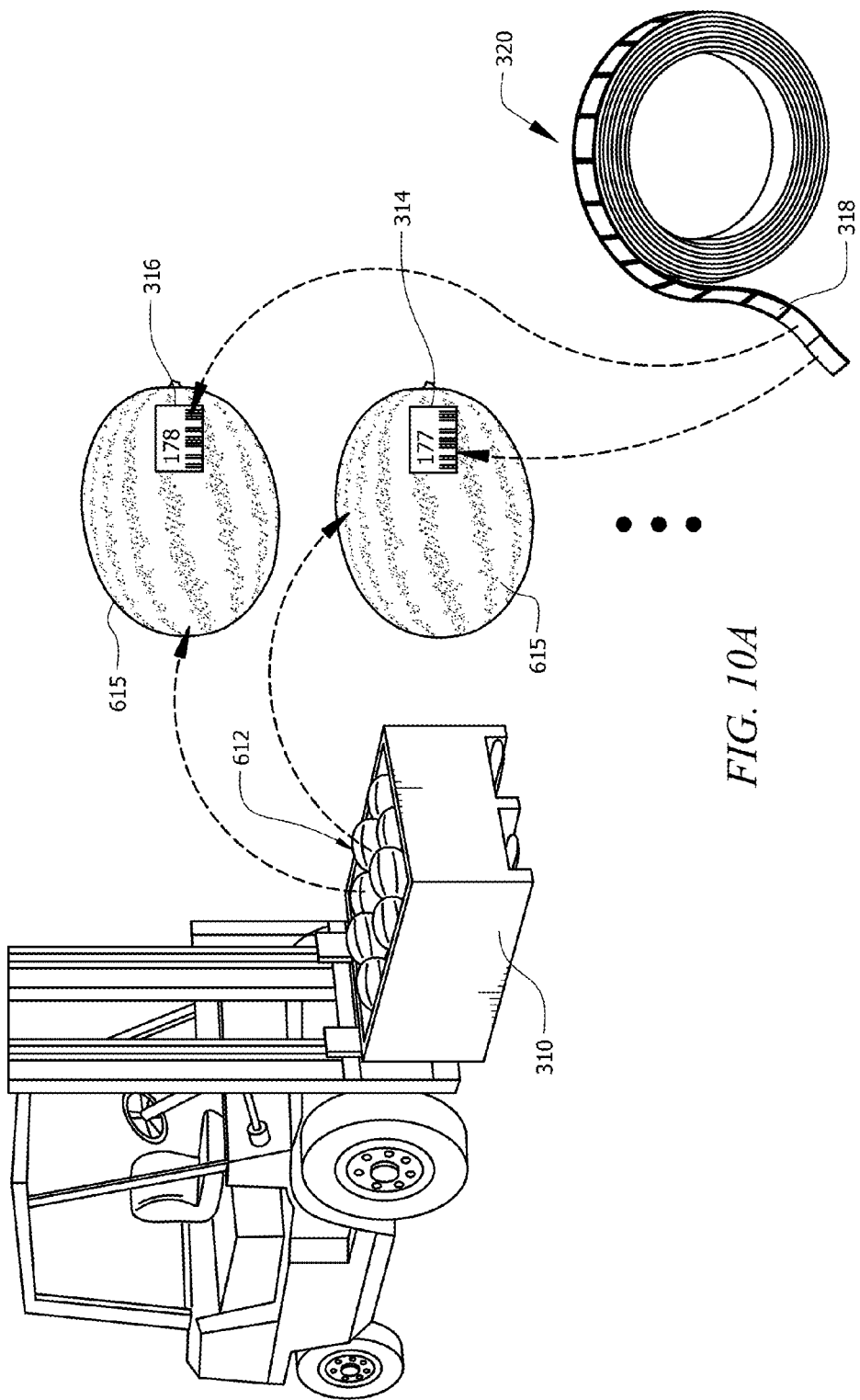
FIG. 10A illustrates a perspective view of a second label system in use.

Referring to FIGS. 10 and 10A, a perspective view of a second label system in use is shown. In this label system, produce 312 such as blueberries, cherry tomatoes, grape tomatoes, etc, are delivered from the field to a packing station/area in bulk, preferably in containers 310, as known in the industry. In the packing area, the produce 312 is removed from the containers 310, sorted, inspected and placed in end-customer containers 315, as also known in the industry.

In the past, a label was affixed to the end-customer containers 315 describing the product and having a UPC bar code for scanning at, for example, a grocery store. The UPC bar code label of the past for this type of produce 312 had no tracking data for either quality control/feedback or for health and safety reasons.

Likewise, as shown in FIG. 10A, larger produce 612 such as melons, cantaloupe, eggplant, etc, are delivered from the field to a packing station/area in bulk, preferably in containers 310, as known in the industry. In the packing area, the produce 612 is sorted and inspected as known in the industry.

In an improved method of tracking produce, a tracking label is affixed to each of the end-customer containers 315 from a sequential source 320 such as a roll of labels 320 or sheets of labels in which the labels are used in order. The labels 314/316/318 have a known sequence of symbols such that, given a first set of symbols and a last set of symbols, all intermediate symbols are known. The simplest such sequence is a linear sequence such as 535601, 535602, 535603 . . . 535650. In such, knowing the first in the sequence (535601) and the last in the sequence (535650) all intermediate symbols are known such as 535647, etc. More complex sequences of symbols are also anticipated such as pseudo-random number sequences or sequences in which each symbol is separated from the previous symbol by a known distance such as 535600, 535701, 535802. . . It is preferred that each symbol be unique so that no two containers have the same symbol and that each symbol is mathematically related to the prior symbol such that given the prior symbol, an algorithm will determine the value of the next symbol. In the simplest case, the algorithm is, "add one." In this, if the prior symbol is 120098, then adding one produces 120099. Many such algorithms are anticipated and, in some examples, the algorithm produces symbols that do not appear to be related to each other as when the algorithm includes, for example, a pseudo-random sequence. In such, by using the prior number as the seed to a pseudo-random function, the next number is determined, etc. In some embodiments, the true index number or symbols is hidden within a larger set of numbers/symbols. For example, "4895 8952 8432 3311" might be on the label, but the corresponding index number might be parts of this taken, perhaps, out of sequence, for example, 1158432895. Other parts of the number/symbol are anticipated to be either filler, an identification of a company, check digits, etc. With such, software that receives the digits/symbols from the customer is better able to determine if the customer mistyped the sequence, etc.

For larger fruit 615, a tracking label 314/316/318 is affixed to each fruit 615 from a sequential source 320 such as a roll of labels 320 or sheets of labels in which the labels are used in order. The tracking labels 314/316/318 are affixed to the larger fruit 615, for example, in the field or at the packing station.

In this improved method of tracking produce, at the beginning of a processing batch (e.g. the first run in the morning or when a first bulk container 310 from a given field is processed), the first label 314 in the sequence is captured, preferably by a scanner 322 (see FIG. 11) into the computing system (e.g. scanner 322 or server 30) or alternately by placing a sacrificial label 314/316/318 on a report sheet, etc. As end-customer containers 315 are filled, the next label 316 in the sequence is affixed to the end-customer containers 315 until the batch is complete (e.g. last run of the day, the bulk container 310 is empty or all bulk containers 310 from a given location are empty, etc). A similar operation is performed for the larger fruit 615, the next label 316 in the sequence is affixed to the next piece of fruit 615 until the batch is complete (e.g. last run of the day, picking in the field is complete, the bulk container 310 is empty, etc).

Now the last label 316 or next label 318 from the sequential labels 320 is captured, preferably by a scanner 322 into the computing system (e.g. scanner 322 or server 30) or alternately by placing a sacrificial label 314/316/318 on a report sheet. Now information regarding the batch of produce 312/612 is captured and/or entered into the computing system (e.g. scanner 322 or server 30) and associated with the entire sequence of labels 314/316/318. The information includes any data related to the produce 312/612 such as field of origin, date picked, picker(s), harvest crew, harvest event, time picked, packing station, etc.

Figure 11:
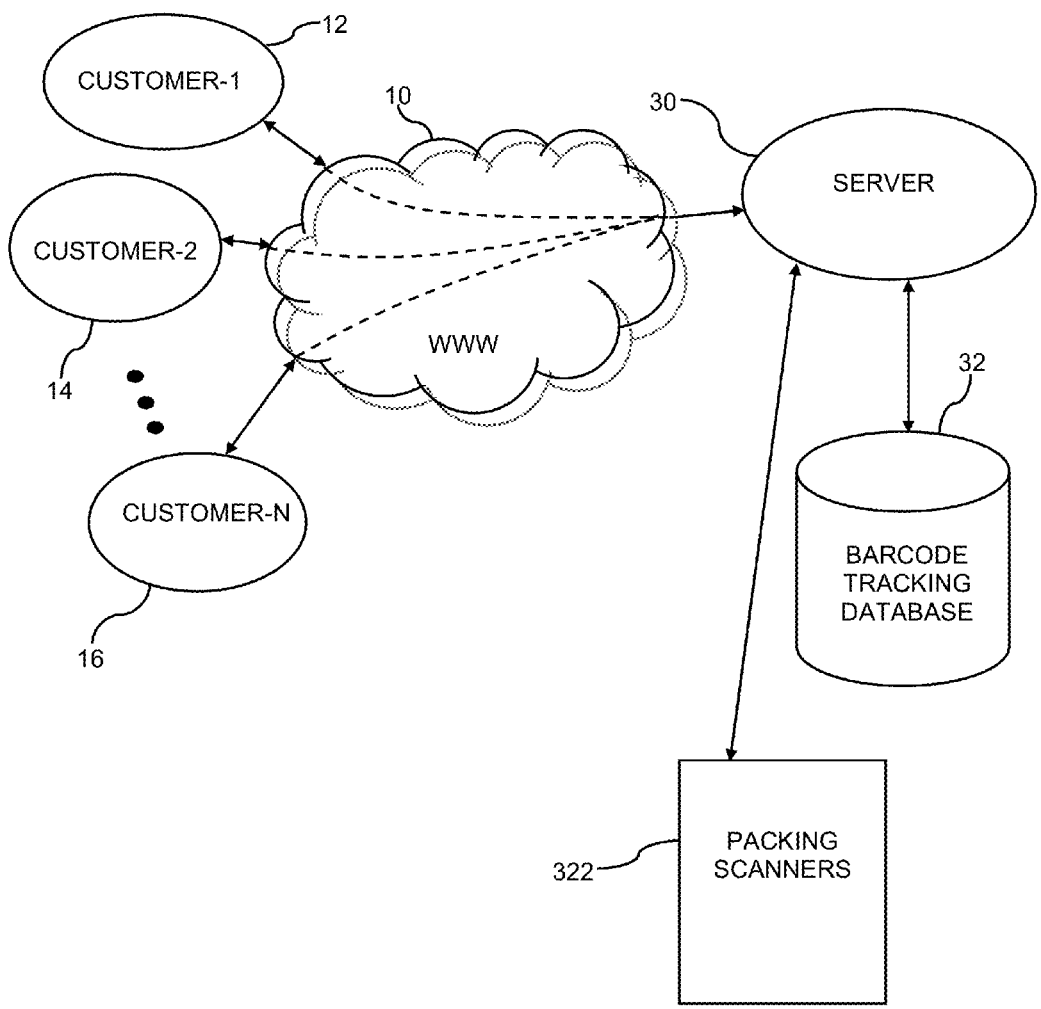
FIG. 11 illustrates a schematic view of a second system for tracking produce.

Referring to FIG. 11, a schematic view of a second system for tracking produce is shown. At the beginning of the day or at the start of a batch, the first label 314 (or first remaining label 314) of a roll 320 (registration label) is scanned by a packing scanner 322. In some embodiments, the code (e.g. barcodes) is stored and held at the scanner (packing scanner) 322 until the scanner 322 is connected to the server 30, while in other embodiments, the code (e.g. barcodes) is transferred to the server 30. There are many ways to connect the scanner(s) 322 to the server 30 including, but not limited to, a wireless connection (e.g., 802.11, IRDA, other IR link), a wired connection (e.g., USB, DB9 Serial Port) and a wired connection within a cradle (e.g., USB, Serial) whereas the cradle also provides power for charging the scanner 322. In some embodiments, the server 30 is located remote to the scanners 322 and the code is transmitted to the server 30 through a wide area network such as the internet 10.

The uploaded data contains a data record for the first code (e.g. barcode) in a sequence of codes (e.g. barcodes). The data record contains at least the code (e.g. barcode) of the first label 314 and an identification of the origin (e.g., a specific plot, field, etc.). Optional data in the record includes picker information, dates, times, etc. In some embodiments, the origin emanates from a stored value in the scanner 322. In some embodiments, the origin is keyed in or scanned into the scanner 322. In some embodiments, the origin is keyed into the server 30 or another computer (not shown) as known for entering data.

The uploaded data is entered into a barcode tracking database 32 for future access and analysis. Subsequent codes are then associated with the same data. At the end of the shift or other desired time (e.g. when changing to produce that originated at a different field), the last label used from the roll 316 or the next label to be used from the roll 318 is scanned by the scanner 322. The code from this label 316/318 is also uploaded to the server 30. The server then associates all sequential labels between the first label 314 scanned (registration label) and the last label 316/318 scanned (end label) with the same source and/or other information captured with the first label scanned (registration label).

One use of the data records in the barcode tracking database 32 is to determine the origin of a given field end-user package 315 for tracing to origin and/or for providing feedback to the grower regarding customer feedback.

In some embodiments, the server 30 is networked to the Internet 10 (WWW) and one or more customers 12/14/16 have access to an application in which the customers 12/14/16 enter a code 314/316/318 from a end-customer package 315 and provide feedback regarding the quality, freshness, taste, etc. In some embodiments, the feedback is added to the barcode tracking database 32 and is then accessible to the owner/manager of the originating farm(s).

Figure 12:
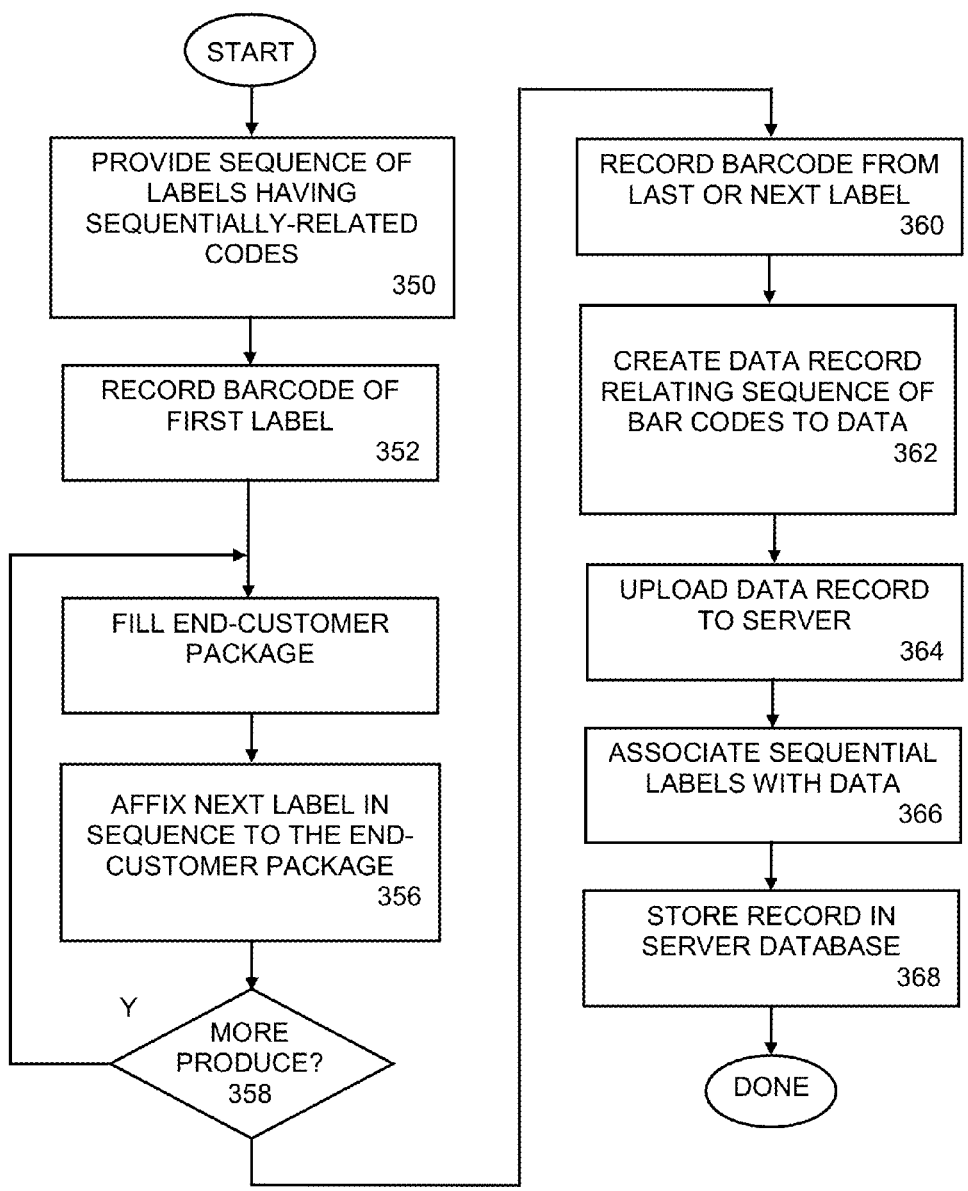
FIG. 12 illustrates a first flow chart of the second system for tracking produce.

Referring to FIG. 12, a first flow chart of the second system for tracking produce is shown. First, a sequential source 320 such as a roll of labels 320 or sheets of labels in which the labels are used in order is provided 350. It is preferred that the sequential source of labels 320 be pre-printed. The labels 314/316/318 have a known sequence of symbols such that, given a first set of symbols and a last set of symbols, all intermediate symbols are known. The simplest such sequence is a linear sequence such as 535601, 535602, 535603 . . . 535650. In such, knowing the first in the sequence (535601) and the last in the sequence (535650) all intermediate symbols are known such as 535647, etc. More complex sequences of symbols are also known such as pseudo-random number sequences or sequences in which each symbol is separated from the previous symbol by a known distance such as 535600, 535701, 5356802 . . .

At the beginning of the day or at the start of a batch, the first label 314 (or first remaining label 314) of a roll 320 (registration label) is scanned 352 by a packing scanner 322 or recorded in any way known in the industry. In some embodiments, the code (e.g. barcodes) is stored and held at the scanner (packing scanner) 322 until the scanner 322 is connected to the server 30, while in other embodiments, the code (e.g. barcodes) is transferred to the server 30.

As each end-customer container 315 is filled 354, the next label 314/316/318 is affixed 356 to the end-customer container 315. These steps 354/356 are repeated 358 until an end point such as the produce 312 is depleted, the shift is over, etc. Now, the sequential code from the last label used 316 or the next label 318 on the sequential source 320 is scanned/recorded 360.

Data is then entered 362 and transferred 364 to the server 30, associated 366 with the sequence of labels 314/316 and stored 368 in the barcode tracking database 32 for future access and analysis. The server associates 366 all sequential labels between the first label 314 scanned (registration label) and the last label 316/318 scanned (end label) with the data (e.g. source of produce 312 and/or other information captured with the first label scanned. The uploaded data contains a data record for the first code (e.g. barcode) in a sequence of codes (e.g. barcodes). The data record contains the code (e.g. barcode) of the first label 314 and an identification of the origin (e.g., a specific plot, field, etc). Optional data in the record includes picker information, dates, times, etc. In some embodiments, the origin emanates from a stored value in the scanner 322. In some embodiments, the origin is keyed in or scanned into the scanner 322. In some embodiments, the origin is keyed into the server 30 or another computer (not shown) as known for entering data.

Figure 13:
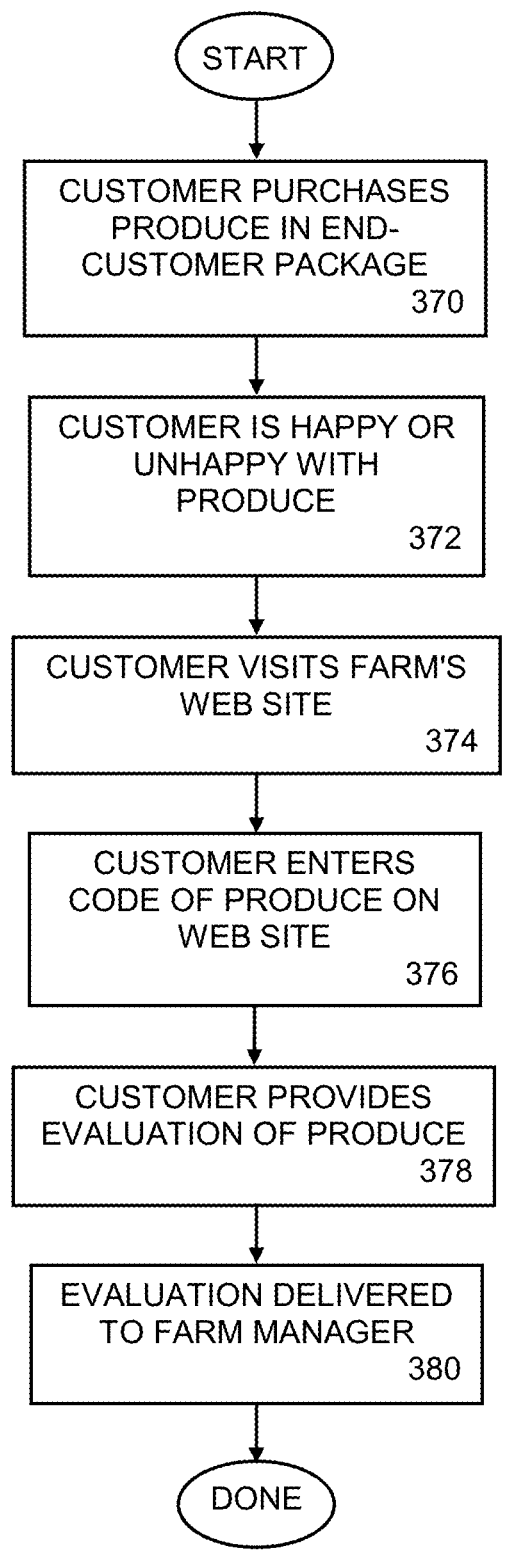
FIG. 13 illustrates a second flow chart of the second system for tracking produce.

Referring to FIG. 13, a second flow chart of the second system for tracking produce is shown. After a customer purchases the produce 370 and is either happy or unhappy with the produce 372, they are now able to provide feedback directly to the farm, picker and/or manager down to the package or plot level. In one embodiment, there is a web address (e.g., http://www.wishfarms.com) printed on the label 314/316/318. The customer accesses the web address 374 and is presented with a user interface (such as that in FIG. 7). The customer enters the label identification (e.g., code from label 314/316/318) 376 into the user interface then provides their evaluation of the produce 378. For example, the customer is unhappy because the produce is spoiled. Once the evaluation is completed by the customer, it is stored and available for delivery to the farm manager 380 or other person so that they can act upon the evaluation.

Figure 14:
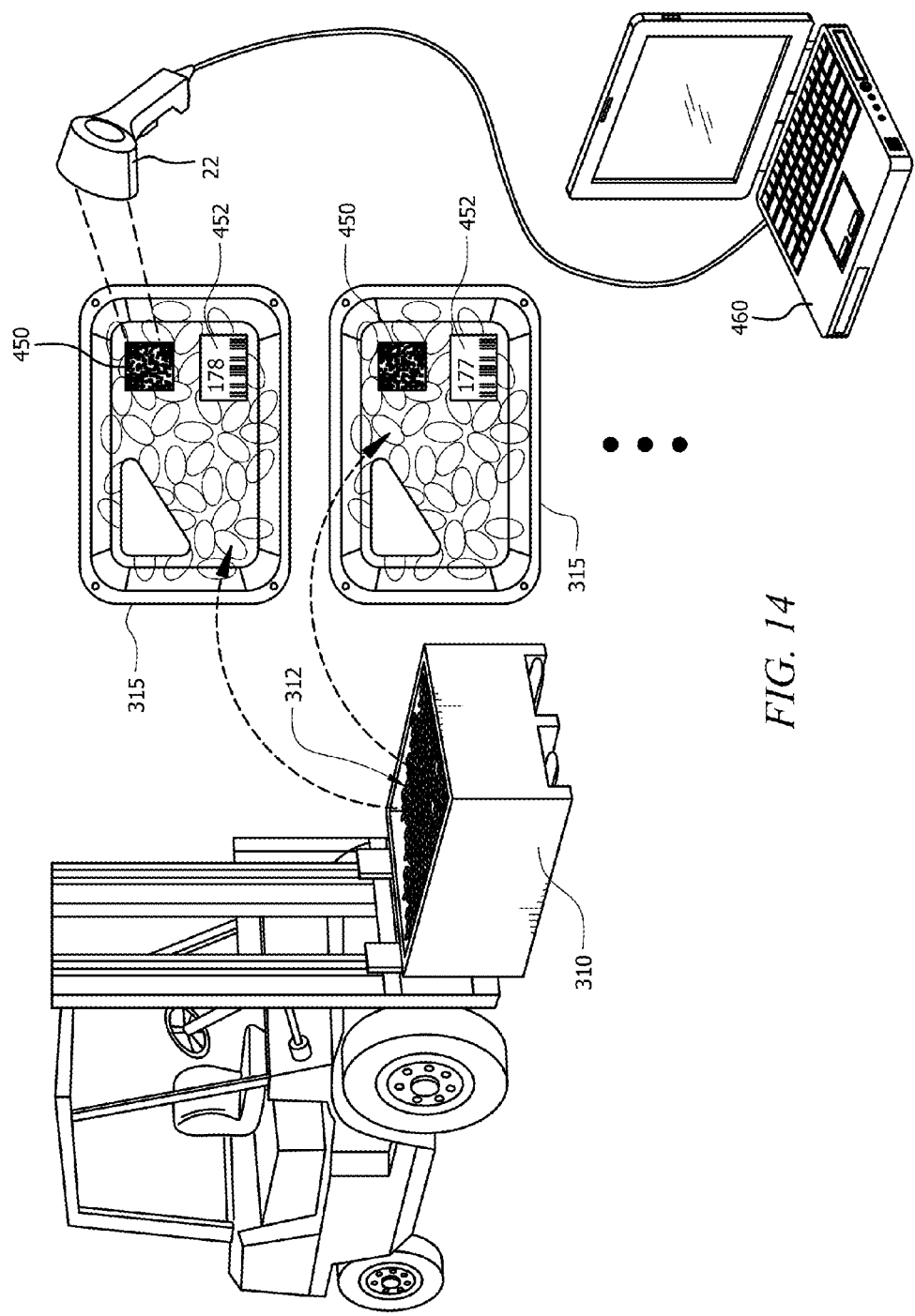
FIG. 14 illustrates a perspective view of an alternate use of the label system.
Figure 14A:
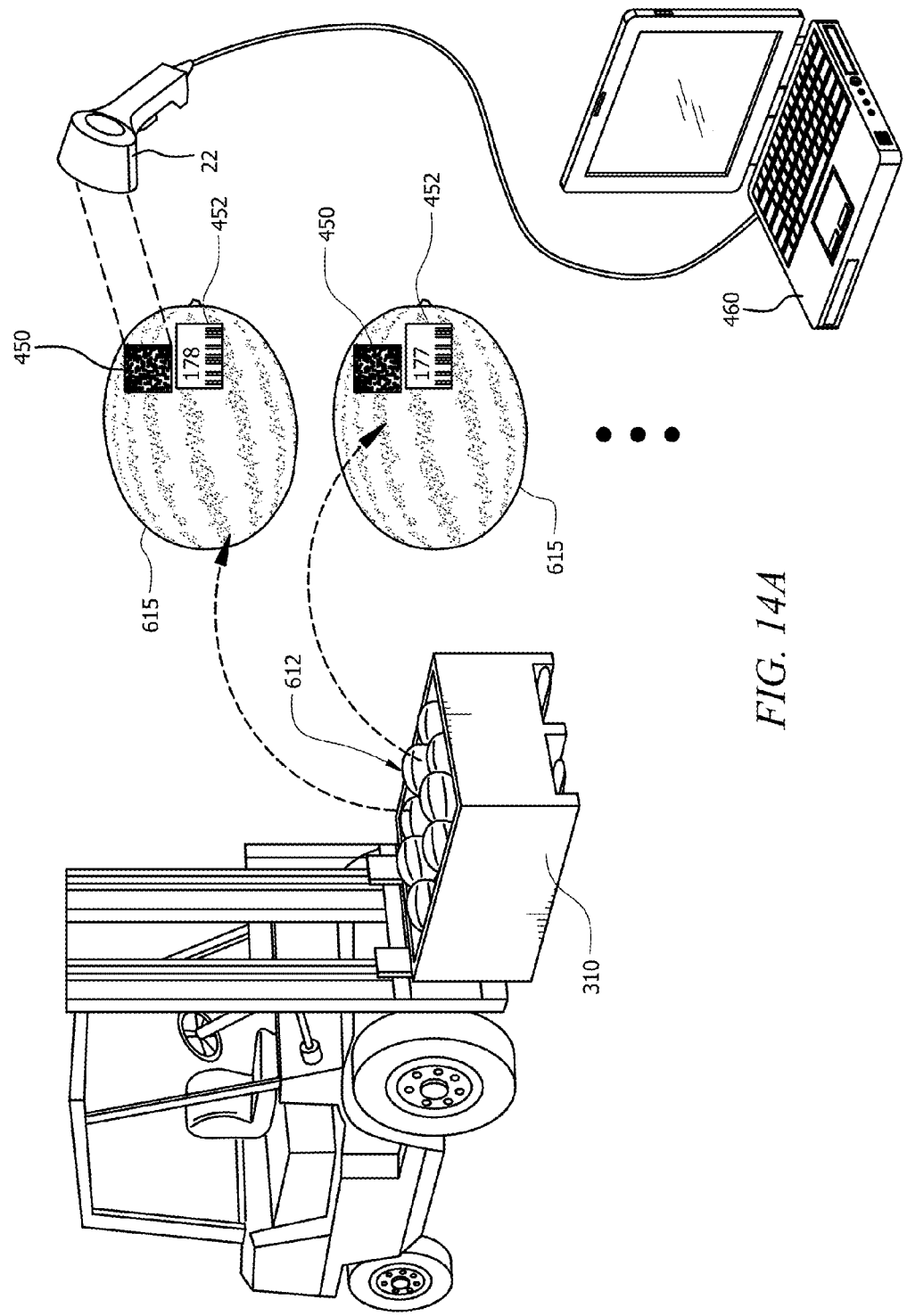
FIG. 14A illustrates a second perspective view of the alternate use of the label system.

Referring to FIGS. 14 and 14A, a perspective view of an alternate use of the label system is shown. In this, produce is delivered to a packing area, typically a building that shields the produce, workers and equipment from the elements (e.g. rain). In the example shown in FIG. 14, a fork lift has delivered a crate of produce (e.g. blueberries) to the packing area and the produce is placed in end-customer containers 315. Each end-customer container 315 has a unique code embedded within a scannable identifier, for example, a barcode 450, which is shown as a QR-code 450 in this example. Any scannable identifier is anticipated including all forms of barcodes, RFIDs, etc. The scannable identifier 450 (e.g. barcode) is, in some embodiments, a label that is placed on the end-customer containers 315 either before filling or after filling. In some embodiments, the scannable identifiers 450 are pre-printed directly on the end-customer containers 315.

The unique code within the scannable identifier 450 (e.g. barcode or QR-code) is statistically unique, in that, no two unique codes have the same value so as to permit identification of the produce by the unique code. By statistically unique, it is anticipated that, in some embodiments, a particular code will be reused (e.g. not unique) but this will have no interference consequence because use of the original code will have been discontinued or would not interfere. For example, most fresh produce has a very short shelf life and, therefore, it is anticipated that after an amount of time has passed (e.g. months or years), the codes and/or sequences are reusable because the end-customer containers 315 sold months ago or years ago are no longer in circulations. Likewise, the same codes are used, in some examples, by multiple growers, and since each grower maintains a separate database, there is no confusion between codes that overlap. The important aspect is that, during the expected life of the object being identified (e.g. package of produce), the statistically unique codes uniquely relate to a single package of produce and any data associated with a given statistically unique code uniquely relates back to that object being identified.

Some scannable identifiers 450 (e.g. QR codes) permit substantial amounts of data to be encoded into the identifier 450. For example, QR codes (Quick Response codes) include from 1800 to 7000 characters of data, depending upon the types of characters encoded. Therefore, some of the data encoded in the identifier 450 includes the unique code as well as non-unique data (e.g. a web address, phone number, etc.). Therefore, no two labels will have the same unique code (at least statistically or during the expected life of the unique code) and the combination of non-unique data (e.g. web address, phone number, etc.) with unique code results in a unique, scannable identifier 450. In some embodiments, the scannable identifiers 450 have a known sequence of symbols although this is not a requirement. The simplest such sequence is a linear sequence such as 535601, 535602, 535603 . . . 535650. More complex sequences of symbols are also anticipated such as pseudo-random number sequences or sequences in which each symbol is separated from the previous symbol by a known distance such as 535600, 535701, 535802... It is preferred that each symbol be unique so that no two containers have the same symbol. It is anticipated, though not required, that the scannable identifier 450 is scannable by the end user. For example, some scannable identifier 450 (e.g. QR codes) are scanned by the end user using a smartphone that has a camera. The camera is used to capture an image of the scannable identifier 450 and software running on the smartphone interprets the data from the scannable identifier 450. In such, the non-unique data from the scannable identifier 450 is, for example, used by either a smartphone application or a web application and the unique data is used by that application to identify the produce.

Once the produce 312 reaches the packing area, data related to the produce such as the origin of the produce, the person or people who picked the produce, etc., are captured. One example of how the data is captured is by entering information into a computer device 460 such as the name(s) of the pickers, field identification, lot numbers, etc. Another example of how the data is captured is scanning or reading a code from a barcode, storage medium, or RF-ID, for example, from a badge of the person delivering the produce 310 to the packing area or from the crate containing the produce 310, etc. Another example of how the data is captured is from a source on the Internet 10 such as a local weather report, providing the weather conditions on the date that the produce 310 was picked, etc. Any mechanism to obtain/capture data related to the produce 310 and store that information in the computer 460 is anticipated and included here within.

Before or after the end-customer containers 315 are filled with the produce 310, the scannable identifier 450 (e.g., QR-Code) is scanned/read with a scanning device or reader 22 (e.g. hand scanner 22, RF-ID reader, or an automatic scanner associated with a conveyor belt, etc.) that is interfaced to a computer. Before, while, or after the end-customer containers 315 are filled, information about the produce 312 is associated with the unique codes from the scannable identifier 450 so that, in the future, if the scannable identifier 450 (e.g., QR-Code) is scanned, the information about the produce 312 is readily retrieved providing the unique code associated with the scannable identifier 450 (e.g., QR-Code), and hence the produce stored in the containers 315.

Although not required, in some embodiments, a second barcode 452/454 is affixed to the end-customer containers 315 for scanning by in-store scanning systems that are not able to scan the identifier 450 (e.g. unable to scan a QR-code).

A similar process is anticipated for larger fruit 612, in which, similar scannable identifiers 450 (e.g., QR-Code) are affixed to each fruit 615 and scanned/read (before affixing or after affixing) with a scanning device or reader 22 that is interfaced to a computer. The information about the produce 612 is associated with the unique codes from the scannable identifier 450 so that, in the future, if the scannable identifier 450 (e.g., QR-Code) is scanned, the information about the produce 612 is readily retrieved providing the unique code associated with the scannable identifier 450 (e.g., QR-Code), and hence the larger produce 612. It is anticipated that the labels scannable identifiers 450 and, optionally the second barcode 452/454, are affixed to the fruit 615 at any time in the processing including in the field while being picked and in the processing facility, etc.

Although not required, in some embodiments, a second barcode 452 is affixed to the larger produce 615 for scanning by in-store scanning systems that are not able to scan the identifier 450 (e.g. unable to scan a QR-code).

Figure 15:
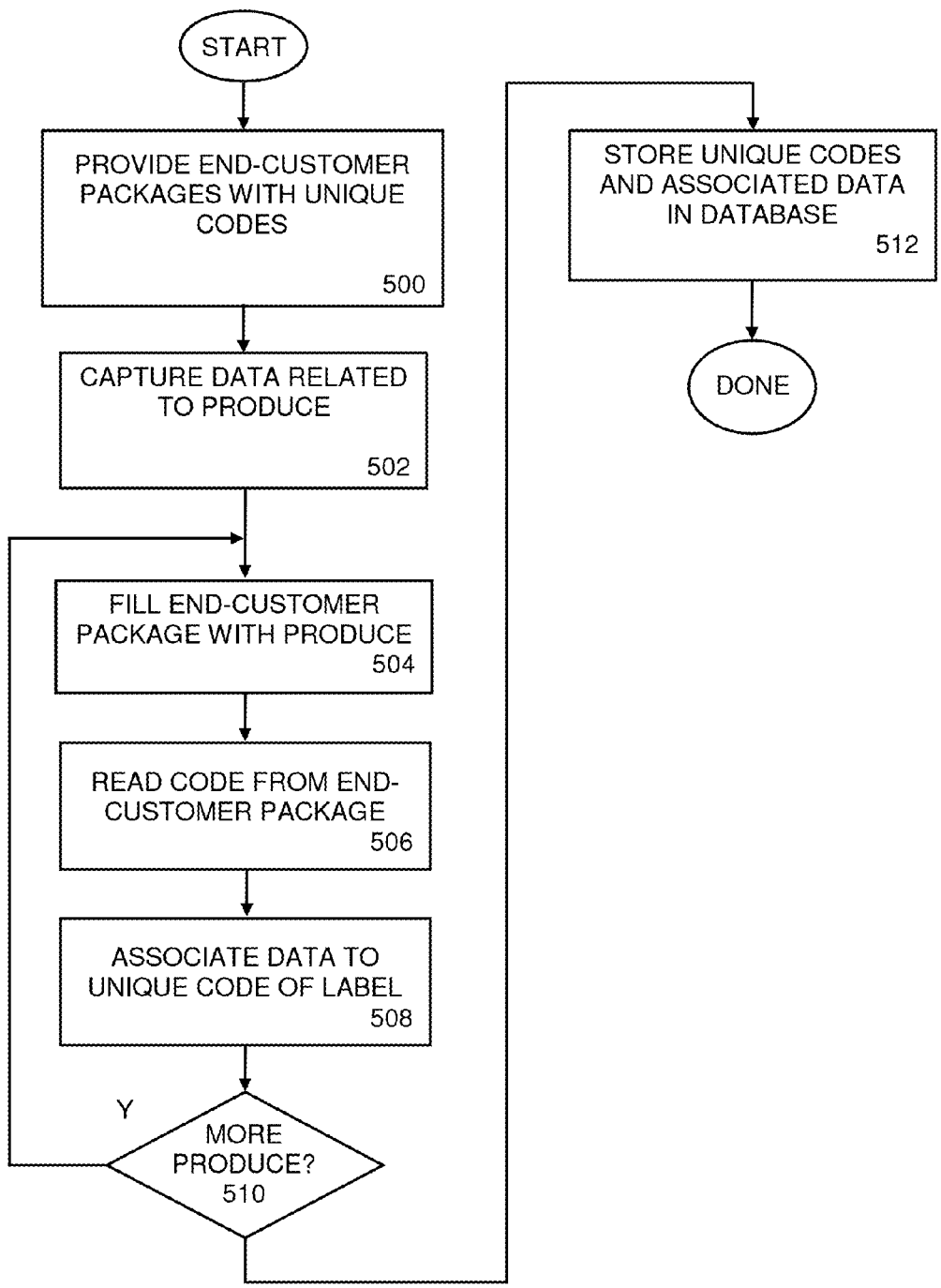
FIG. 15 illustrates a first flow chart of the alternate use of the label system for tracking produce that is packed in a packing facility.

Referring to FIG. 15, a first flow chart of the alternate use of the label system for tracking produce that is packed in a packing facility is shown. The produce 310 is to be packaged in end-customer containers 315. The end-customer containers have 500 scannable identifiers 450 (e.g. QR-codes), affixed to the end-customer containers 315 (before or after filling), pre-printed directly on the end-customer containers 315 or manufactured into the end-customer containers 315.

At some point, preferably (but not required) before filling of the end-customer containers 315, data associated with the batch of produce is captured/read 502 (e.g. picker(s), source field, etc.). The data is any data related to the produce such as the origin of the produce, the person or people who picked the produce, the time and date, local weather etc. One example of how the data is captured 502 is by entering information into a computer device 460 such as the name(s) of the pickers, field identification, lot numbers, etc. Another example of how the data is captured 502 is scanning or reading a code from, for example, a barcode, storage medium, or RF-ID. For example, this data is read from a badge of the person delivering the produce 310 to the packing area or from the crate containing the produce 310, etc. Another example of how the data is captured 502 is from a source on the Internet 10 such as a local weather report, providing the weather conditions on the date that the produce 310 was picked, etc. Any mechanism to obtain/capture 502 data related to the produce 310 and store that information in the computer 460 is anticipated.

Following the capture of data, end-customer containers 315 are filled with the produce 504 until, for example, there is no more produce remaining in the batch 510. Before, during, or after the filling process, the scannable identifier 450 is scanned 506 and the unique code is scanned/read from the scannable identifiers 450 and the unique code is associated 508 with the data relating to the produce 310. Before or after all of the produce 310 is packaged, the associated unique codes and the data regarding the produce 310 are stored 512, for example, in a database on a server for access when a user has, for example, a complaint about the produce 310.

In some embodiments, the origin of the produce is determined from the badge barcode 37 and, therefore, the data record includes the badge barcode 37. In some embodiments, the data record includes an identifier uniquely identifying the origin of the produce (field, row, plot, etc.).

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for tracking produce delivered to a consumer, the produce originating from a produce origin, the system comprising:
   a plurality of produce originating from a first produce origin;
   a sequence of pre-printed labels, each having a unique code and the unique code on each label is sequentially related to the unique code on a previous label;
   a computer system;

capturing a value of a first label of the sequence of pre-printed labels and storing the value into the computer system;

affixing the first label to a first produce from the plurality of produce;

repeating the step of applying the next label from the sequence of pre-printed labels to another of the plurality of produce until all of the plurality of produce dons one of the sequence of pre-printed labels;

capturing a value of a last or next of the sequence of pre-printed labels into the computer system; and associating the entire set of labels from the first of the sequence of pre-printed labels through last or next of the sequence of pre-printed labels with the produce origin in a tracking database at the computer system.

2. The system for tracking produce delivered to a consumer of claim 1, wherein the mathematically sequential value of the unique code on each label in sequence in relationship to the unique code on the previous label is a fixed numerical value.

3. The system for tracking produce delivered to a consumer of claim 2, wherein the fixed numerical value is one.

4. The system for tracking produce delivered to a consumer of claim 1, wherein the mathematically sequential value of the unique code on each label in sequence in relationship to the unique code on the previous label is a pseudo-random difference.

5. The system for tracking produce delivered to a consumer of claim 1, wherein the mathematically sequential value of the unique code on each label in sequence in relationship to the unique code on the previous label is a series of alpha-numeric symbols.

6. The system for tracking produce delivered to a consumer of claim 1, wherein the produce origin comprises one or more data-items selected from the group consisting of a field of origin, a date picked, one or more picker identifications, a harvest crew, a harvest event, a time picked, and a packing station.

7. A method for tracking produce delivered to a consumer, the method comprising:
   (a) providing a plurality of produce from a produce origin;
   (b) capturing data related to the produce origin;
   (c) providing a sequence of pre-printed labels, each of the labels having a unique code and the unique code on each label in sequence having a mathematically sequential value with relationship to the unique code on a previous label;
   (d) capturing the unique code from a first pre-printed label of the sequence of pre-printed labels into a computer system;
   (e) affixing the preprinted label from the sequence of pre-printed labels on a first produce of the plurality of produce;
   (f) repeating affixing a next preprinted label from the sequence of pre-printed labels on a next of the plurality of produce until all of the produce in the plurality of produce don a label from the sequence of pre-printed labels;
   (g) capturing a unique code from the last pre-printed label used from the sequence of pre-printed labels into the computer system; and
   (h) associating all of the unique codes from the unique code from the first pre-printed label of the sequence to the unique code from the last pre-printed label with the data in a tracking database.

8. The method of claim 7, wherein the mathematically sequential value of the unique code on each label in sequence in relationship to the unique code on the previous label is a fixed numerical value.

9. The method of claim 8, wherein the fixed numerical value is one.

10. The method of claim 7, wherein the mathematically sequential value of the unique code on each label in sequence in relationship to the unique code on the previous label is a pseudo-random difference.

11. The method of claim 7, wherein the mathematically sequential value of the unique code on each label in sequence in relationship to the unique code on the previous label is a sequence of alpha-numeric symbols.

12. The method of claim 7, wherein the data consists of one or more data-items selected from the group consisting of the produce origin, a date picked, one or more picker identifications, a harvest crew, a harvest event, a time picked, and a packing station.

13. A system for tracking a plurality of produce from a produce origin, the system comprising:
   capturing data related to the plurality of produce into a computer system;
   affixing a unique code onto each of the produce, each of the unique codes being sequentially related to a previous unique code;
   capturing a value of a first unique code into a computer system;
   capturing a value of a last unique code into a computer system; and
   relating the unique codes from the value of the first unique code through to the value of the last unique code with data related to the produce, the data including an identification of the produce origin.

14. The system for tracking produce delivered to a consumer of claim 13, wherein the unique codes are sequentially related by a fixed numerical value.

15. The system for tracking produce delivered to a consumer of claim 14, wherein the fixed numerical value is one.

16. The system for tracking produce delivered to a consumer of claim 13, wherein the unique codes are sequentially related by a pseudo-random difference.

17. The system for tracking produce delivered to a consumer of claim 13, wherein the unique codes are provided on pre-printed labels.

18. The system for tracking produce delivered to a consumer of claim 17, wherein the pre-printed labels are on a roll of pre-printed labels.

19. The system for tracking produce delivered to a consumer of claim 13, wherein the data consists of one or more data-items selected from the group consisting of the produce origin, a date picked, one or more picker identifications, a harvest crew, a harvest event, a time picked, and a packing station.

* * * * *